(12) United States Patent
Zhao et al.

(10) Patent No.: US 12,261,305 B2
(45) Date of Patent: Mar. 25, 2025

(54) METHOD FOR PREPARING HIGHLY STABLE CATALYST COATING SLURRY FOR FUEL CELLS

(71) Applicant: SINOHYKEY TECHNOLOGY GUANGZHOU CO. LTD., Guangzhou (CN)

(72) Inventors: Mingquan Zhao, Guangdong (CN); Shanyun Mo, Guangdong (CN); Jiaqiang Zhong, Guangdong (CN); Yunsong Yang, Guangdong (CN); Siyu Ye, Guangdong (CN); Yuquan Zou, Guangdong (CN); Junke Tang, Guangdong (CN); Dennis Sun, Guangdong (CN); Tom Wu, Guangdong (CN)

(73) Assignee: SINOHYKEY TECHNOLOGY GUANGZHOU CO. LTD., Guangzhou (CN)

( * ) Notice: Subject to any disclaimer, the term of this patent is extended or adjusted under 35 U.S.C. 154(b) by 569 days.

(21) Appl. No.: 17/674,780

(22) Filed: Feb. 17, 2022

(65) Prior Publication Data
US 2022/0190353 A1 Jun. 16, 2022

Related U.S. Application Data

(63) Continuation of application No. PCT/CN2021/112605, filed on Aug. 13, 2021.

(30) Foreign Application Priority Data

Dec. 11, 2020 (CN) .......................... 202011453516.3

(51) Int. Cl.
*H01M 4/88* (2006.01)
*H01M 4/92* (2006.01)

(52) U.S. Cl.
CPC ........... *H01M 4/8828* (2013.01); *H01M 4/92* (2013.01)

(58) Field of Classification Search
CPC .... H01M 4/88; H01M 4/8825; H01M 4/8828; H01M 4/92; H01M 4/8663;
(Continued)

(56) References Cited

U.S. PATENT DOCUMENTS

2005/0130025 A1\* 6/2005 Kadowaki ........... H01M 8/0213
252/502

FOREIGN PATENT DOCUMENTS

| CN | 1560949 A | 1/2005 |
| CN | 1560950 A | 1/2005 |

(Continued)

OTHER PUBLICATIONS

CN 112042025 (English Translation provided by PatentPak).\*
JP 2003036856 (English Translation provided by PatentPak).\*

*Primary Examiner* — Daniel C. McCracken
*Assistant Examiner* — Joshua Maxwell Speer
(74) *Attorney, Agent, or Firm* — Andrew C. Cheng

(57) ABSTRACT

The invention relates to the field of fuel cells, and in particular to a method for preparing highly stable catalyst coating slurry for fuel cells. The method for preparing highly stable catalyst coating slurry for fuel cells, includes at least two mixing and dispersing steps. The first mixing and dispersing step is carried out to mix and disperse the catalyst, perfluorosulfonic acid resin and solvent to obtain a first-stage mixed dispersion, and the other mixing and dispersing steps are carried out to mix and disperse the previous-stage mixed dispersion and the newly added perfluorosulfonic acid resin, wherein at least one mixing and dispersing step has a surfactant is added for mixing and dispersing. The catalyst in the catalyst slurry prepared by the (Continued)

method has good dispersion stability and less sedimentation, and good performance is achieved when the catalyst slurry is applied to membrane electrodes.

11 Claims, 2 Drawing Sheets

(58) Field of Classification Search
CPC .............. H01M 4/8668; H01M 4/926; H01M 2008/1095; Y02E 60/50
See application file for complete search history.

(56) References Cited

FOREIGN PATENT DOCUMENTS

| | | | | |
|---|---|---|---|---|
| CN | 109755590 A | | 5/2019 | |
| CN | 112042025 A | * | 12/2020 | .......... H01M 4/8663 |
| JP | 2003036856 A | * | 2/2003 | |
| WO | WO-2013021627 A1 | * | 2/2013 | .......... H01M 4/8605 |

* cited by examiner

METHOD FOR PREPARING HIGHLY STABLE CATALYST COATING SLURRY FOR FUEL CELLS

FIELD

The invention relates to the field of fuel cells, and in particular to a method for preparing highly stable catalyst coating slurry for fuel cells.

BACKGROUND

A membrane electrode is a core component of a fuel cell. The performance of a membrane electrode is determined by the structure of a catalyst layer in the membrane electrode to a great extent, and the structure of the catalyst layer is subject to the preparation and coating of catalyst slurry. In industrial production, generally, the membrane electrode slurry prepared at one time can be used to produce a batch of catalyst-coated membranes. It generally takes a long time (24 h at least) from the completion of preparing the catalyst slurry to the production of all the catalyst slurry into a batch of catalyst-coated membranes. Since the catalysts in the catalyst slurry are generally metals or metal oxides with relatively high density, after these metals or metal oxides are dispersed, they are prone to sedimentation during storage. The performance of the catalyst-coated membrane made from the catalyst slurry with the catalyst sedimentation is quite different from that of the catalyst coating membrane prepared from the catalyst slurry without catalyst sedimentation.

In the prior art, in order to improve the dispersion stability of the catalyst in the catalyst slurry, there are two methods. The first method is implemented by: first mixing the catalyst slurry, solvent and surfactant; then, stirring the catalyst to make it dispersed uniformly in the solvent under the action of the surfactant to form a catalyst dispersion; and then adding the perfluorosulfonic acid resin to the catalyst dispersion and well mixing the resulting solution to prepare a catalyst slurry. The second method is implemented by directly mixing a surfactant, the perfluorosulfonic acid resin, catalyst and solvent, and then performing high-energy dispersion to obtain a catalyst slurry.

SUMMARY

The invention provides a method for preparing a highly stable catalyst coating slurry for fuel cells. The catalyst in the catalyst slurry prepared by the method has good dispersion stability and less sedimentation, and good performance is achieved when the catalyst slurry is applied to membrane electrodes.

The inventors found experimentally that the catalyst slurry prepared by the first method mentioned in the background was moderately stable when applied to membrane electrodes, but the performance of the membrane electrodes was poor. Upon analysis, the inventors concluded that the poor performance of the membrane electrodes could be caused by the following reason. In the preparation process of the catalyst dispersion, the catalyst is completely coated with the surfactant so that the perfluorosulfonic acid resin added later cannot be in contact with the catalyst, which affecting the transfer of protons ($H^+$) and resulting in the poor performance of the membrane electrode. According to the inventors, the catalyst slurry prepared by the second method mentioned in the background had a larger particle size. The catalyst slurry was stored for a long time, so the particles with large particle size were prone to aggregation and sedimentation, resulting in unstable performance of the catalyst-coated membrane obtained by successive coating of the catalyst slurry. Upon analysis, the inventors believe that the large particle size of catalyst slurry may be caused by the following reason. Under the action of solvent and high-energy dispersion, the interaction between perfluorosulfonic acid resin intensifies, causing dramatic changes (such as increased entanglement) in the microscopic morphology of perfluorosulfonic acid resin and changes in the adsorption state of the perfluorosulfonic acid resin and the catalyst particles, resulting in the large particle size of the slurry and difficulty in dispersion. In order to clarify the effect of the addition ratio of the catalyst, the perfluorosulfonic acid resin and the surfactant on the particle size of the slurry, the inventors did a series of experiments. The effect of the ratio of catalyst/(perfluorosulfonic acid resin+surfactant) in the slurry on the particle size of the slurry can be concluded from Table 1 that the particle size of the slurry gradually decreases as the ratio of catalyst/(perfluorosulfonic acid resin+surfactant) increases. However, in order to ensure that the catalyst slurry meets the requirements of the membrane electrode performance, the ratio of catalyst/(perfluorosulfonic acid resin+surfactant) the catalyst slurry is a specific value (it may fluctuate in a small range). And this specific small value leads to a large particle size and poor stability of the catalyst slurry prepared according to the second method in the background.

TABLE 1

Effect of catalyst/(resin + surfactant) ratio in the slurry on the particle size of the slurry

| Slurry No. | Catalyst/(Resin + Surfactant) | Dispersion time (h) | Particle size (μm) | | |
|---|---|---|---|---|---|
| | | | Av. | D50 | D90 |
| 1 | 1.50 | 2 | 3.18 | 2.89 | 6.07 |
| 2 | 1.75 | 2 | 2.90 | 2.40 | 5.60 |
| 3 | 2.10 | 2 | 2.40 | 2.20 | 4.40 |
| 4 | 2.62 | 2 | 1.71 | 1.51 | 3.05 |

In order to prepare a catalyst slurry with small particle size, good stability, less sedimentation and good performance for application in membrane electrodes, the invention adopts the following technical solutions.

A method for preparing highly stable catalyst coating slurry for fuel cells, comprising at least two mixing and dispersing steps, the first mixing and dispersing step being carried out to mix and disperse the catalyst, perfluorosulfonic acid resin and solvent to obtain a first-stage mixed dispersion, the other mixing and dispersing steps being carried out to mix and disperse the previous-stage mixed dispersion and the newly added perfluorosulfonic acid resin, wherein at least one mixing and dispersing step has a surfactant added for mixing and dispersing.

Further, among the two adjacent mixing and dispersing steps, the dispersion strength of the former mixing and dispersing step is not less than the dispersion strength of the latter mixing and dispersing step. That is, the sum of the applied energy needed for mixing and dispersing in the former mixing and dispersing step is not less than that needed for mixing and dispersing in the latter mixing and dispersing step.

Further, a bead (sand) mill, an ultrasonic disintegrator, a homogenizer or an air-jet mill is used for mixing and dispersing in the former mixing and dispersing step, and a bead (sand) mill, an ultrasonic disintegrator, a homogenizer, an air-jet mill, a planetary mixer or an electric mixer is used for mixing and dispersing in the latter mixing and dispersing step.

Further, the number of mixing and dispersing steps is two, the solvent in the first mixing and dispersing step includes low-boiling alcohol and water, the perfluorosulfonic acid resin in each mixing and dispersing step is from the perfluorosulfonic acid resin solution, and the solid content of the perfluorosulfonic acid resin solution in each mixing and dispersing step is 5 to 30%; in the first mixing and dispersing step, the ratio of the catalyst, perfluorosulfonic acid resin solution, low-boiling alcohol, water and surfactant is 1:0.10~1:0.5~1.5:8~30:0~0.015; in the second mixing and dispersing step, the ratio of catalyst, perfluorosulfonic acid resin, and surfactant is 1:1~2.5:0~0.02.

Further, the sum of the content of the perfluorosulfonic acid resin and the surfactant in the first mixing and dispersing step is not greater than 40% of the sum of the content of all the perfluorosulfonic acid resin and the surfactant in the catalyst coating slurry prepared by the method.

Further, in the other mixing and dispersing steps, the catalyst is newly added for mixing and dispersing.

Further, the surfactant is a (perfluoro)alkyl or aryisuifonic acid, (perfluoro)alkyl or arylsulfuric acid, (perfluoro)alkyl or arylcarboxylic acid, (perfluoro)alkyl or arylphosphoric acid based anionic small molecule or polymer surfactant with hydrophilic groups.

Further, the perfluorosulfonic acid resin in each mixing and dispersing step is from a perfluorosulfonic acid resin solution, and the perfluorosulfonic acid resin solution is a perfluorosulfonic acid resin solution with an equivalent weight of greater than or equal to 700 and less than 1100.

Further, the perfluorosulfonic acid resin solution is Chemours D2020 perfluorosulfonic acid resin dispersion, Chemours D2021 perfluorosulfonic acid resin dispersion, EW910 perfluorosulfonic acid resin dispersion produced by Dongyue, 3M EW725 perfluorosulfonic acid resin dispersion, 3M EW795 perfluorosulfonic acid resin dispersion, 3M EW980 perfluorosulfonic acid resin dispersion, Solvay EW729 perfluorosulfonic acid resin dispersion, Solvay EW790 perfluorosulfonic acid resin dispersion, AGC IC100 perfluorosulfonic acid dispersion, or AGC IC154 perfluorosulfonic acid dispersion.

Further, the catalyst is a platinum-based catalyst, a platinum alloy catalyst, an iridium catalyst, an iridium alloy catalyst or a catalyst for non-precious metal fuel cells.

Beneficial effect: The invention prepares the catalyst slurry through at least two mixing and dispersing steps. In this way, the perfluorosulfonic acid resin to be added is divided into at least two parts, then the content of the perfluorosulfonic acid resin in the first mixing and dispersing step is less than the perfluorosulfonic acid resin to be added, and the ratio of the catalyst/(perfluorosulfonic acid resin+surfactant) in the first mixing and dispersing step will be corresponding increased, so that the particle size of the first-stage mixed dispersion prepared in the first mixing and dispersing step is relatively small. After the first-stage mixed dispersion with small particle size is obtained, the first-stage mixed dispersion and the newly added perfluorosulfonic acid resin can be mixed to obtain catalyst slurry with small particle size without the need of high-strength dispersion. In this way, the damage to the structure of the perfluorosulfonic acid resin caused by high-strength dispersion can be avoided, the structural integrity of the perfluorosulfonic acid resin can be ensured, the stability of the slurry can be favorably improved so that the catalyst is not prone to sedimentation, and moreover the performance of the membrane electrodes made from the catalyst slurry can be improved. In addition, since the surfactant is added for mixing and dispersing in at least one of the two mixing and dispersing steps, the surfactant and the perfluorosulfonic acid resin interact with each other and are isolated from each other microscopically, which can prevent the surfactant or perfluorosulfonic acid resin from completely coating the catalyst, so as not to affect the transfer of protons ($H^+$). Therefore, the membrane electrodes made from this catalyst slurry has good performance.

DESCRIPTION OF THE EMBODIMENTS

Figure 1:
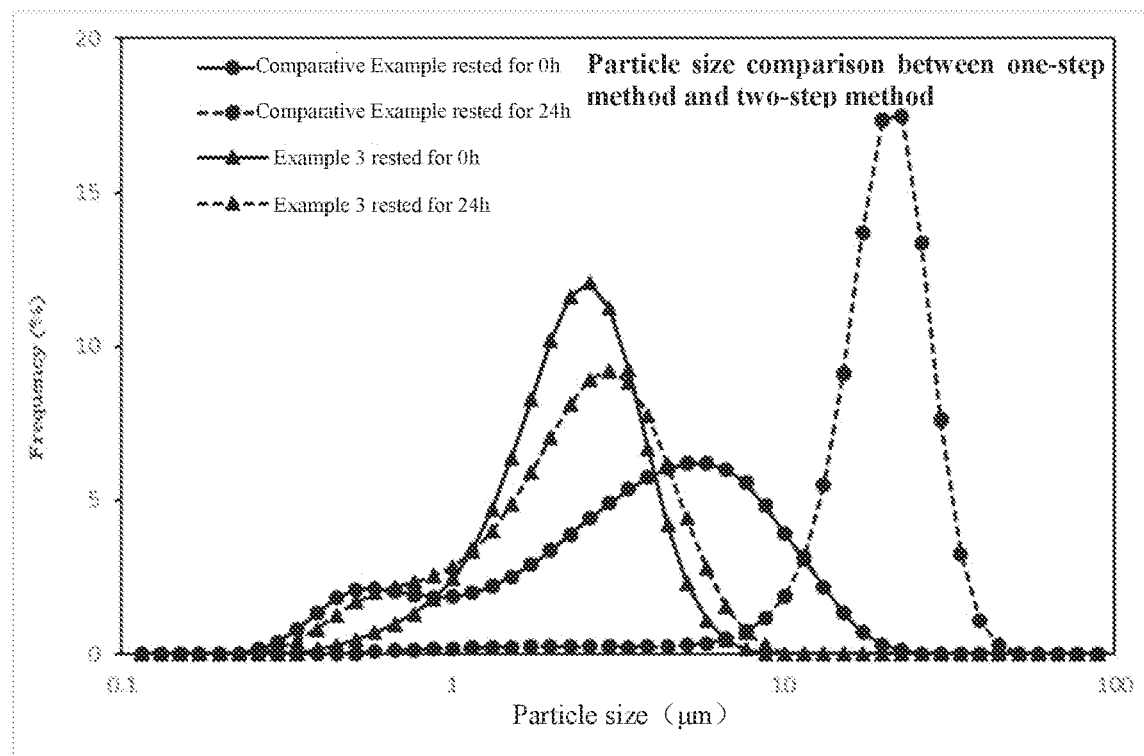
FIG. 1 is a particle size distribution diagram of the catalyst slurries measured when the catalyst slurries were just prepared in Example 3 and Comparative Example and after the slurries were rested for 24 h.

The specific embodiments described here are only for explaining the invention rather than limiting it.

Example 1

(I) First Mixing and Dispersing Step:

(1) According to a ratio of catalyst:surfactant:perfluorosulfonic acid resin solution:n-propanol:water being 1:0.005:0.25:1:11, raw materials were taken and pre-dispersed. Specifically, 110.0 g of water was first weighed and placed in a beaker and then stirred by an electric mixer at a speed of 300 rpm; 10 g of a carbon support deposited with Pt catalyst TEC10F50E™ produced by Tanaka Precious Metals (TKK) was slowly placed into the beaker with stirring; after stirring for 1 min, 0.05 g of a surfactant sodium dodecylbenzenesulfonate, 2.5 g of a Chemours D2020 perfluorosulfonic acid resin solution having a solid content of 20.0%, and 10.0 g of n-propanol were placed into the beaker in sequence; and after the raw materials were added, the resulting solution was further stirred for 5.0 min so that the raw materials were well mixed to obtain the first pre-dispersed solution.

(2) The first pre-dispersed solution in step (1) was milled and dispersed for 30 min in a bead mill at 3000 rpm, and then the obtaining slurry was taken out to obtain the first-stage mixed dispersion.

(II) Second Mixing and Dispersing Step:

(1) According to a ratio of catalyst:perfluorosulfonic acid resin being 1:2, raw materials were weighed and placed into the first-stage mixed dispersion for pre-dispersion: the first-stage mixed dispersion was stirred by an electric mixer at a speed of 300 rpm; 20.0 g of the Chemours D2020 perfluorosulfonic acid resin solution having a solid content of 20.0% and 10.0 g of the carbon support deposited with Pt catalyst TEC10F50E™ produced by Tanaka Precious Metals (TKK) were added to the first-stage mixed dispersion being stirred, and the resulting solution was further stirred for 5.0 min to obtain the second pre-dispersed solution.

(2) The second pre-dispersed solution was milled and dispersed for 10 min in the bead mill at a speed of 1000 rpm, and then the obtaining slurry was taken out and de-foamed to obtain the catalyst slurry.

(III) Preparation of Catalyst-Coated Membrane and Membrane Electrode:

(1) Two sides of the proton exchange membrane were both coated with the catalyst slurry by means of slit coating, wherein the loading of platinum for the cathode was 0.2 mg/cm² and the loading of platinum for the anode was 0.1 mg/cm². After drying, the catalyst-coated membrane (CCM) was obtained.

(2) The membrane electrode assembly (MEA) was obtained by respectively assembling a frame and a gas diffusion layer at each of the anode and the cathode of the catalyst-coated membrane.

Example 2

(I) First Mixing and Dispersing Step:

(1) According to a ratio of catalyst:surfactant:perfluorosulfonic acid resin solution:n-propanol:water being 1:0.005:0.75:1:11, raw materials were taken and pre-dispersed. Specifically, 110.0 g of water was first weighed and placed in a beaker and then stirred by an electric mixer at a speed of 300 rpm; 10 g of a carbon support deposited with Pt catalyst of TEC10F50E™ produced by Tanaka Precious Metals (TKK) was slowly placed into the beaker with stirring; after stirring for 1 min, 0.05 g of a surfactant perfluorooctane sulfonate, 7.5 g of a Chemours D2020 perfluorosulfonic acid resin solution having a solid content of 20.0%, and 10.0 g of n-propanol were placed into the beaker in sequence; and after the raw materials were added, the resulting solution was further stirred for 5.0 min so that the raw materials were well mixed to obtain the first pre-dispersed solution.

(2) The first pre-dispersed solution in step (1) was milled and dispersed for 30 min in a bead mill at a speed of 3000 rpm, and then the obtaining slurry was taken out to obtain the first-stage mixed dispersion.

(II) Second Mixing and Dispersing Step:

(1) According to a ratio of catalyst:perfluorosulfonic acid resin being 1:2, raw materials were weighed and placed into the first-stage mixed dispersion for pre-dispersion: the first-stage mixed dispersion was stirred by the electric mixer at a speed of 300 rpm; 15.0 g of the Chemours D2020 perfluorosulfonic acid resin solution having a solid content of 20.0% and 7.5 g of the catalyst Tec10F50e produced by Tanaka Precious Metals (TKK) were added to the first-stage mixed dispersion being stirred, and the resulting solution was further stirred for 5.0 min to obtain the second pre-dispersed solution.

(2) The second pre-dispersed solution was dispersed for 10 min in the planetary mixer with a revolutionary-rotary ratio of 2/9, and then the obtaining slurry was taken out and de-foamed to obtain the catalyst slurry.

(III) Preparation of Catalyst-Coated Membrane and Membrane Electrode:

(1) Two sides of the proton exchange membrane were both coated with the catalyst slurry by means of slit coating, wherein the loading of platinum for the cathode was 0.2 mg/cm² and the loading of platinum for the anode was 0.1 mg/cm². After drying, the catalyst-coated membrane (CCM) was obtained.

(2) The membrane electrode assembly (MEA) was obtained by respectively assembling a frame and a gas diffusion layer at each of the anode and the cathode of the catalyst-coated membrane.

Example 3

(I) First Mixing and Dispersing Step:

(1) According to a ratio of catalyst:perfluorosulfonic acid resin solution:n-propanol:water being 1:0.75:1:11, raw materials were taken and pre-dispersed. Specifically, 110.0 g of water was first weighed and placed in a beaker and then stirred by an electric mixer at a speed of 300 rpm; 10 g of a carbon support deposited with Pt catalyst TEC10F50E™ produced by Tanaka Precious Metals (TKK) was slowly placed into the beaker with stirring; after stirring for 1 min, 7.5 g of a Chemours D2020 perfluorosulfonic acid resin solution having a solid content of 20.0% and 10.0 g of n-propanol were placed into the beaker in sequence; and after the raw materials were added, the resulting solution was further stirred for 5.0 min so that the raw materials were well mixed to obtain the first pre-dispersed solution.

(2) The first pre-dispersed solution in step (1) was milled and dispersed for 30 min in a bead mill at a speed of 3000 rpm, and then the obtaining slurry was taken out to obtain the first-stage mixed dispersion.

(II) Second Mixing and Dispersing Step:

(1) According to a ratio of catalyst:surfactant:perfluorosulfonic acid resin being 1:0.005:2, raw materials were weighed and placed into the first-stage mixed dispersion for pre-dispersion: the first-stage mixed dispersion was stirred by the electric mixer at a speed of 300 rpm; 7.5 g of the catalyst Tec10F50e produced by Tanaka Precious Metals (TKK), 0.0375 g of a surfactant perfluorooctane sulfonate, and 15.0 g of the Chemours D2020 perfluorosulfonic acid resin solution having a solid content of 20.0% and were added to the first-stage mixed dispersion being stirred, and the resulting solution was further stirred for 5.0 min to obtain the second pre-dispersed solution.

(2) The second pre-dispersed solution was dispersed for 10 min in the planetary mixer with a revolutionary-rotary ratio of 2/9, and then the obtaining slurry was taken out and de-foamed to obtain the catalyst slurry.

(III) Preparation of Catalyst-Coated Membrane and Membrane Electrode:

(1) Two sides of the proton exchange membrane were both coated with the catalyst slurry by means of slit coating, wherein the loading of platinum for the cathode was 0.2 mg/cm² and the loading of platinum for the anode was 0.1 mg/cm². After drying, the catalyst-coated membrane (CCM) was obtained.

(2) The membrane electrode assembly (MFA) was obtained by respectively assembling a frame and a gas diffusion layer on the anode and the cathode on two sides of the catalyst-coated membrane.

Example 4

(I) First Mixing and Dispersing Step:

(1) According to a ratio of catalyst:surfactant:perfluorosulfonic acid resin solution:n-propanol:water being 1:0.005:0.75:1:11, raw materials were taken and pre-dispersed. Specifically, 110.0 g of water was first weighed and placed in a beaker and then stirred by an electric mixer at a speed of 300 rpm; 10 g of a carbon support deposited with Pt catalyst TEC10F50E™ produced by Tanaka Precious Metals (TKK) was slowly placed into the beaker with stirring; after stirring for 1 min, 0.05 g of a fluorocarbon surfactant Zonyl9360, 7.5 g of a Chemours D2020 perfluorosulfonic acid resin solution having a solid content of 20.0%, and 10.0 g of n-propanol were placed into the beaker in sequence; and after the raw materials were added, the resulting solution was further stirred for 5.0 min so that the raw materials were well mixed to obtain the first pre-dispersed solution.

(2) The first pre-dispersed solution in step (1) was milled and dispersed for 30 min in a bead mill at a speed of 3000 rpm, and then the obtaining slurry was taken out to obtain the first-stage mixed dispersion.

(I) Second Mixing and Dispersing Step:

(1) According to a ratio of catalyst:surfactant:perfluorosulfonic acid resin being 1:0:005:2, raw materials were weighed and placed into the first-stage mixed dispersion for pre-dispersion: the first-stage mixed dispersion was stirred by the electric mixer at a speed of 300 rpm; 7.5 g of the carbon support deposited with Pt catalyst TEC10F50E™ produced by Tanaka Precious Metals (TKK), 0.0375 g of the fluorocarbon surfactant Zonyl9360, and 15.0 g of the Chemours D2020 perfluorosulfonic acid resin solution having a solid content of 20.0% and were added to the first-stage mixed dispersion being stirred, and the resulting solution was further stirred for 5.0 min to obtain the second pre-dispersed solution.

(2) The second pre-dispersed solution was dispersed for 10 min in the planetary mixer with a revolutionary-rotary ratio of 2/9, and then the obtaining slurry was taken out and de-foamed to obtain the catalyst slurry.

(III) Preparation of Catalyst-Coated Membrane and Membrane Electrode:

(1) Two sides of the proton exchange membrane were both coated with the catalyst slurry by means of slit coating, wherein the loading of platinum for the cathode was 0.2 mg/cm$^2$ and the loading of platinum for the anode was 0.1 mg/cm$^2$. After drying, the catalyst-coated membrane (CCM) was obtained.

(2) The membrane electrode assembly (MEA) was obtained by respectively assembling a frame and a gas diffusion layer at each side of the anode and the cathode of the catalyst-coated membrane.

In the first mixing and dispersing step, the ratio range of catalyst:perfluorosulfonic acid resin solution:low boiling point alcohol:water:surfactant is 1:0.10~1:0.5~1.5:8~30:0~0.015, and the raw materials were taken in any ratio within this rate range. In the second mixing and dispersing step, the ratio range of the catalyst:perfluorosulfonic acid resin:surfactant is 1:1~2.5:0~0.02, and the raw materials may also be taken in any ratio within this rate range. The highly stable catalyst slurry can be prepared according to the methods of the above-mentioned examples, so the examples will not be described one by one here.

Comparative Example

Preparation of Catalyst Slurry (1) According to a ratio of catalyst:perfluorosulfonic acid resin solution:n-propanol:water being 1:2.25:1:11, raw materials were taken and pre-dispersed. Specifically, 110.0 g of water was first weighed and placed in a beaker and then stirred by an electric mixer at a speed of 300 rpm; while stirring, 10 g of the carbon support deposited with Pt catalyst TEC10F50E™ produced by Tanaka Precious Metals (TKK) was slowly placed into the beaker with stirring; after stirring for 1 min, 22.5 g of the Chemours D2020 perfluorosulfonic acid resin solution having a solid content of 20.0% and 10.0 g of n-propanol were placed into the beaker in sequence; and after the raw materials were added, the resulting solution was further stirred for 5.0 min so that the raw materials were well mixed to obtain the pre-dispersed solution.

(2) The pre-dispersed solution in step (1) was milled and dispersed for 40 min in the bead mill at a speed of 3000 rpm, and then the obtaining slurry was taken out and de-foamed to obtain the catalyst slurry.

(II) Preparation of Catalyst-Coated Membrane and Membrane Electrode:

(1) Two sides of the proton exchange membrane were both coated with the catalyst slurry by means of slit coating, wherein the loading of platinum for the cathode was 0.2 mg/cm$^2$ and the loading of platinum for the anode was 0.1 mg/cm$^2$. After drying, the catalyst-coated membrane (CCM) was obtained.

(2) The membrane electrode assembly (MEA) was obtained by respectively assembling a frame and a gas diffusion layer at each of the anode and the cathode of the catalyst-coated membrane.

The particle sizes of the slurries just prepared and the slurries rested for 24 h of Example 3 and Comparative Example were tested, and the results are shown in FIG. 1, It can be seen from FIG. 1 that the particle size of the slurry just prepared in Example 3 is significantly smaller than that of the slurry just prepared in Comparative Example, which indicates that the catalyst slurry prepared by the method of the invention has a small particle size and a good dispersion effect. Compared with the particle size of the slurry just prepared of Example 3, the particle size of the slurry of Example 3 that was rested for 24 h changed slightly. While the particle size of the slurry prepared in Comparative Example increased significantly after being rested for 24 h. This indicates that the catalyst slurry prepared by the method of the invention has good stability and will not aggregate obviously during the resting process.

Figure 2:
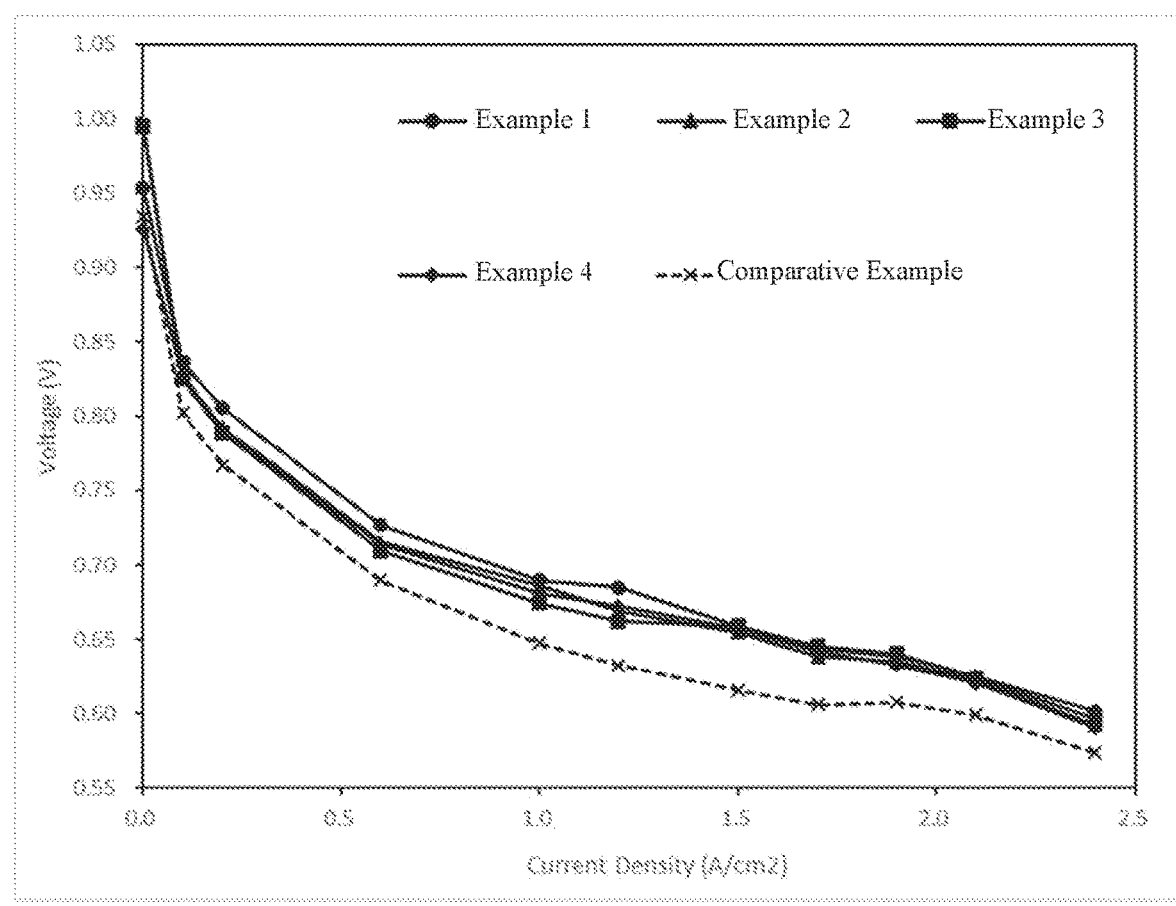
FIG. 2 is a performance diagram of the membrane electrodes prepared in Examples 1 to 4 and Comparative Example.

The performance of the membrane electrodes prepared in Examples 1 to 4 and Comparative Example were tested, and the results are shown in FIG. 2. It can be seen from FIG. 2 that the performance of the membrane electrodes prepared in Examples 1 to 4 is better than that of the membrane electrode prepared in the Comparative Example, indicating that the membrane electrodes obtained by coating the catalyst slurry prepared by the method of the invention has good performance.

The method for preparing the catalyst according to the invention can also include three or more mixing and dispersing steps, which will not be enumerated here.

The above descriptions are only the preferred embodiments of the invention, and the invention is not limited to the above-mentioned embodiments. There may be some minor structural changes in the implementation process. If the various changes or modifications of the invention do not depart from the spirit and scope of the invention and fall within the scope of the claims and equivalent technologies of the invention, the invention is also intended to include these changes and modifications.

What is claimed is:

1. A method for preparing catalyst coating slurry for fuel cells, comprising at least two mixing and dispersing steps of which a first mixing and dispersing step is carried out to mix and disperse a catalyst, a perfluorosulfonic acid resin and a solvent to obtain a first-stage mixed dispersion, and the other mixing and dispersing steps being carried out to mix and disperse a previous-stage mixed dispersion and newly added perfluorosulfonic acid resin, wherein at least one of the mixing and dispersing steps has a surfactant added for mixing and dispersing;

wherein among two adjacent mixing and dispersing steps, a dispersion strength of the latter mixing and dispersing step is less than a dispersion strength of the former mixing and dispersing step.

2. The method for preparing catalyst coating slurry for fuel cells according to claim 1, wherein a bead mill, a sand mill, an ultrasonic disintegrator, a homogenizer or an air-jet mill is used for mixing and dispersing in the former mixing and dispersing step, and a bead mill, a sand mill, an ultrasonic disintegrator, a homogenizer, an air-jet mill, a planetary mixer or an electric mixer is used for mixing and dispersing in the latter mixing and dispersing step.

3. The method for preparing catalyst coating slurry for fuel cells according to claim 1, the number of mixing and dispersing steps is two, the solvent in the first mixing and dispersing step comprises low-boiling alcohol and water, the perfluorosulfonic acid resin in each mixing and dispersing step is from a perfluorosulfonic acid resin solution, and a solid content of the perfluorosulfonic acid resin solution in each mixing and dispersing step is 5 to 30%;
    in the first mixing and dispersing step, a ratio of the catalyst, the perfluorosulfonic acid resin solution, the low-boiling alcohol, the water and the surfactant is 1:0.10~1:0.5~1.5:8~30:0~0.015; and
    in the second mixing and dispersing step, a ratio of the catalyst, the perfluorosulfonic acid resin, and the surfactant is 1:1~2.5:0~0.02.

4. The method for preparing catalyst coating slurry for fuel cells according to claim 3, wherein a sum of the content of the perfluorosulfonic acid resin and the surfactant in the first mixing and dispersing step is not greater than 40% of a sum of the content of all the perfluorosulfonic acid resin and the surfactant in the catalyst coating slurry prepared by the method.

5. The method for preparing catalyst coating slurry for fuel cells according to claim 1, wherein in the other mixing and dispersing step, a catalyst is newly added for mixing and dispersing.

6. The method for preparing catalyst coating slurry for fuel cells according to claim 1, wherein the surfactant is one of the following:
    a perfluoroalkylsulfonic acid based anionic small molecule or polymer surfactant with hydrophilic groups or a perfluoroarylsulfonic acid based anionic small molecule or polymer surfactant with hydrophilic groups,
    a perfluoroalkyl sulphate acid based anionic small molecule or polymer surfactant with hydrophilic groups or a perfluoroarylsulfuric acid based anionic small molecule or polymer surfactant with hydrophilic groups,
    a perfluoroalkyl carboxylic acid based anionic small molecule or polymer surfactant with hydrophilic groups or a perfluoroarylcarboxylic acid based anionic small molecule or polymer surfactant with hydrophilic groups, and
    a perfluoroalkyl phosphoric acid based anionic small molecule or polymer surfactant with hydrophilic groups or a perfluoarylphosphoric acid based anionic small molecule or polymer surfactant with hydrophilic groups.

7. The method for preparing catalyst coating slurry for fuel cells according to claim 1, wherein the perfluorosulfonic acid resin in each mixing and dispersing step is from a perfluorosulfonic acid resin solution with an equivalent weight of greater than or equal to 700 and less than 1100.

8. The method for preparing catalyst coating slurry for fuel cells according to claim 1, wherein the catalyst is a platinum-based catalyst, a platinum alloy catalyst, an iridium catalyst, an iridium alloy catalyst or a catalyst for non-precious metal fuel cells.

9. The method for preparing catalyst coating slurry for fuel cells according to claim 1, wherein each mixing and dispersing step comprises preparing a pre-dispersed solution and milling and dispersing the pre-dispersed solution; and
    among two adjacent mixing and dispersing steps, a speed of milling and dispersing of the latter pre-dispersed solution of the latter mixing and dispersing step is less than that of the former mixing and dispersing step, and a duration of milling and dispersing the pre-dispersed solution of the latter mixing and dispersing step is shorter than that of the former mixing and dispersing step.

10. The method for preparing catalyst coating slurry for fuel cells according to claim 9, wherein the at least two mixing and dispersing steps comprise a first mixing and dispersing step and a second mixing and dispersing step;
    the pre-dispersed solution prepared in the first mixing and dispersing step is milled and dispersed for 30 mins at a speed of 3000 rpm; and
    the pre-dispersed solution prepared in the second mixing and dispersing step is milled and dispersed for 10 mins at a speed of 1000 rpm.

11. The method for preparing catalyst coating slurry for fuel cells according to claim 1, wherein the at least two mixing and dispersing steps comprise a first mixing and dispersing step and a second mixing and dispersing step;
    the first mixing and dispersing step comprises preparing a first pre-dispersed solution, and milling and dispersing the first pre-dispersed solution for 30 mins in a bead mill at a speed of 3000 rpm; and
    the second mixing and dispersing step comprises preparing a second pre-dispersed solution, and dispersing the second pre-dispersed solution for 10 mins in a planetary mixer with a revolutionary-rotary ratio of 2/9.

* * * * *